(12) United States Patent
Shioiri et al.

(10) Patent No.: US 9,765,830 B2
(45) Date of Patent: Sep. 19, 2017

(54) SELECTABLE ONE-WAY CLUTCH

(71) Applicant: TOYOTA JIDOSHA KABUSHIKI KAISHA, Toyota-shi, Aichi (JP)

(72) Inventors: Hiroyuki Shioiri, Yokohama (JP); Hideaki Komada, Gotemba (JP); Hiroyuki Shibata, Odawara (JP); Yuki Kurosaki, Susono (JP); Hiroki Yasui, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/074,022

(22) Filed: Mar. 18, 2016

(65) Prior Publication Data

US 2016/0273595 A1  Sep. 22, 2016

(30) Foreign Application Priority Data

Mar. 20, 2015  (JP) ................. 2015-057967

(51) Int. Cl.
*F16D 41/12* (2006.01)
*F16D 28/00* (2006.01)
*F16D 41/14* (2006.01)

(52) U.S. Cl.
CPC ........... *F16D 28/00* (2013.01); *F16D 41/125* (2013.01); *F16D 41/14* (2013.01)

(58) Field of Classification Search
CPC ............................. F16D 41/125; F16D 48/10
See application file for complete search history.

(56) References Cited

U.S. PATENT DOCUMENTS

| | | | | |
|---|---|---|---|---|
| 3,384,204 A | * | 5/1968 | Swift | F16D 65/54 |
| | | | | 188/196 B |
| 2009/0194385 A1 | * | 8/2009 | Cao | F16D 65/14 |
| | | | | 192/12 B |
| 2012/0138411 A1 | * | 6/2012 | Samie | F16H 57/08 |
| | | | | 192/85.01 |

FOREIGN PATENT DOCUMENTS

| | | | |
|---|---|---|---|
| JP | 5120650 B2 | 1/2013 | |
| WO | WO 2010011478 A2 * | 9/2010 | ............. F16D 25/00 |

* cited by examiner

*Primary Examiner* — Stacey Fluhart
(74) *Attorney, Agent, or Firm* — Andrews Kurth Kenyon LLP

(57) ABSTRACT

A selectable one-way clutch is provided. The selectable one-way clutch is shifted between overrunning mode and engagement mode by rotating a selector plate interposed between a notch plate and a pocket plate. The selectable one-way clutch comprises: a plunger that is connected to the selector plate and that is reciprocated by the actuator; a thermally shrinkable stopper member that is fitted onto the plunger; and a stationary member to which the stopper member is brought into abutment by a reciprocating motion of the plunger.

3 Claims, 3 Drawing Sheets

SELECTABLE ONE-WAY CLUTCH

The present invention claims the benefit of Japanese Patent Application No. 2015-057967 filed on Mar. 20, 2015 with the Japanese Patent Office, the disclosure of which is incorporated herein by reference in its entirety.

BACKGROUND

Field of the Invention

Preferred example relates to the art of a selectable one-way clutch adapted to selectively enable torque transmission only in one direction and to interrupt torque transmission in both directions.

Discussion of the Related Art

One example of a one-way clutch used in a hybrid vehicle is described in Japanese Patent No. 5120650. In the hybrid vehicle taught by Japanese Patent No. 5120650, an outer race of the one-way clutch is connected to a motor-generator, and an inner race of the one-way clutch is connected to a casing. According to the teachings of Japanese Patent No. 5120650, the outer race is allowed to rotate relatively with the inner race in the forward direction, but inhibited to rotate relatively with the inner race in the counter direction. The motor-generator may be uses as a starter of the engine.

A conventional selectable one-way clutch is adapted to selectively enable torque transmission only in one direction. To this end, in the selectable one-way clutch, a selector plate interposed between a pocket plate and a notch plate is rotated by an electromagnetic actuator or the like to selectively provide an engagement between the selector plate and the pocket plate. The selectable one-way clutch of this kind may also be used in the hybrid vehicle taught by Japanese Patent No. 5120650 instead of the one-way clutch.

In order to reduce friction, lubrication oil is applied to friction sites between the pocket plate and the selector plate, and between the selector plate and the notch plate. However, if viscosity of the oil is too high, the selector plate may be rotated unwillingly by a drag torque or a shearing force resulting from a rotation of the notch plate. For this reason, the pocket plate may be brought into engagement accidentally with the notch plate if temperature is extremely low.

SUMMARY

Aspects of preferred embodiment has been conceived noting the foregoing technical problems, and it is therefore an object of the preferred embodiment is to provide a selectable one-way clutch that can prevent an unwilling rotation of the selector plate caused by an increase in viscosity of the lubrication oil at low temperature.

Present application relates to a selectable one-way clutch in which a notch plate is selectively brought into engagement with a pocket plate by rotating a selector plate interposed therebetween by an actuator. In order to achieve the above-explained objective, according to the preferred application, the selectable one-way clutch is provided with: a plunger that is connected to the selector plate and that is reciprocated by the actuator; a stopper member that is fitted onto the plunger; and a stationary member to which the stopper member is brought into abutment by a reciprocating motion of the plunger. Specifically, the stopper member may be made of heat-shrinkable material in such a manner as to allow the reciprocating motion of the plunger when it is thermally expanded, and to restrict the reciprocating motion of the plunger when it is thermally shrunk.

In a non-limiting embodiment, the stopper member may be brought into abutment to the stationary member by the reciprocating motion of the plunger in a direction to bring the notch plate into engagement to the pocket plate.

In a non-limiting embodiment, the stopper member may include a ring fitted onto the plunger, and the ring may be made of the heat-shrinkable material to be fitted tightly on the plunger when it is thermally shrunk.

In a non-limiting embodiment, an annular groove may be formed on the plunger, and the ring may be made of the heat-shrinkable material in such a manner that an inner circumferential portion thereof enters into the annular groove when it is thermally shrunk.

Thus, in the selectable one-way clutch according to the present application, the stopper member is fitted tightly onto the plunger with a temperature drop. At low temperature, viscosity of the lubrication oil is increased and hence the selector plate may be rotated unwillingly by a torque of the notch plate applied through the lubrication oil. However, the plunger may be prevented from being pushed into the actuator by the stopper member thus fitted tightly onto the plunger. According to the present application, therefore, the selectable one-way clutch can be prevented from being brought into engagement mode undesirably.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 1b is an enlarged cross-sectional view showing the area I in FIG. 1a;

FIG. 3b is an enlarged cross-sectional view showing the area II in FIG. 3a.

DETAILED DESCRIPTION OF THE ILLUSTRATIVE EMBODIMENT(S)

Figure 2:
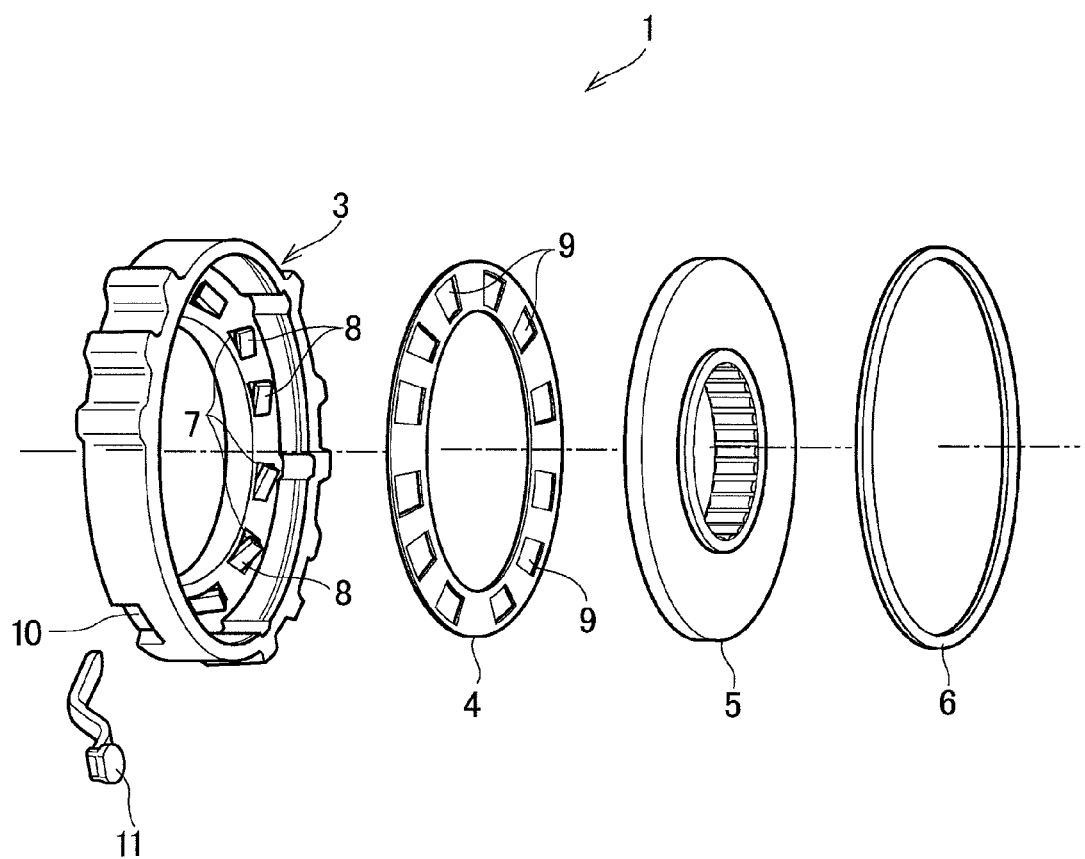
FIG. 2 is a perspective view showing structural elements of the selectable one-way clutch.

A preferred example of the present invention will now be explained with reference to the accompanying drawings. Referring now to FIG. 2, there is shown structural elements of a selectable one-way clutch (to be abbreviated as the "SOWC" hereinafter) 1 according to the preferred example. As shown in FIG. 2, the SOWC 1 comprises a pocket plate 3, a selector plate 4, and a notch plate 5. The pocket plate 3 comprises an annular plate and an outer cylinder formed around an outer circumference of the annular plate. The selector plate 4 and the notch plate 5 are held in the cylinder in the order shown in FIG. 2, and a snap ring 6 is fitted into a clearance between an outer circumference of the notch plate 5 and an inner circumference of the cylinder of the pocket plate 3 to close the pocket plate 3.

As illustrated in FIG. 2, a plurality of pockets (or depressions) 7 are formed in a circular manner on a face of the annular plate of the pocket plate 3 being opposed to the notch plate 5, and a rectangular strut 8 is individually held in each pocket 7 in a pivotal manner around one end thereof as a fulcrum. In order to push up the other end of the strut 8 toward the notch plate 5, a spring (not shown) is interposed between one end of the strut 8 and a bottom of the pocket 7.

The selector plate 4 is an annular member having similar dimensions as the annular plate of the pocket plate 3, and apertures 9 are formed on the selector plate 4 in a circular manner and in a same number as the pockets 7. For example, when the selector plate 4 is rotated in the pocket plate 3 to an engagement position at which the apertures 10 are individually overlapped with each of the pockets 7, said other end (to be called the "leading end" hereinafter) of each strut 8 is allowed to be pushed up by the spring to be brought into engagement with a notch (not shown) of the notch plate 5. By contrast, when the selector plate 4 is rotated to an overrunning position at which the apertures 10 are individually displaced from each of the pockets 7, each strut 8 is pushed into the pocket 7 by the selector plate 4.

The notch plate 5 is also an annular member, and the aforementioned notches are formed on a face of the notch plate 5 facing to the pocket plate 3 in a circular manner and in the same number as the pockets 7. When the leading end of the strut 8 is pushed into the notch through the aperture 10, the leading end of the strut 8 is brought into abutment to an engagement wall of the notch.

Figure 1A:
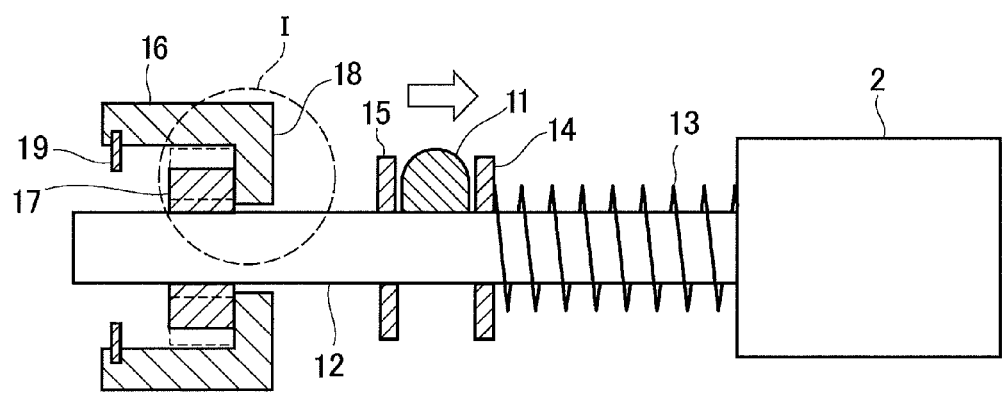
FIG. 1a is a cross-sectional view showing a cross-section of the stopper and the ring according to the preferred example.
Figure 1B:
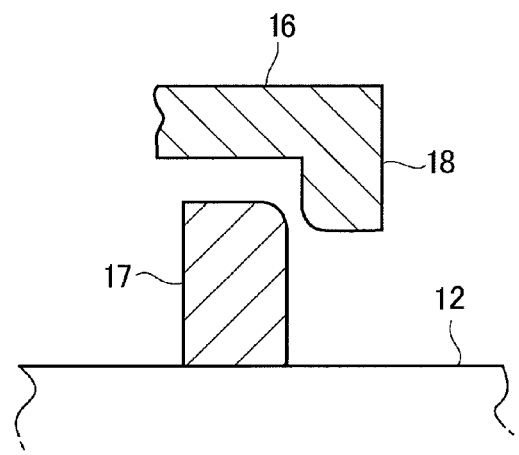

A through hole 10 having a predetermined width is formed on the cylinder of the pocket plate 3, and a connecting arm 11 is inserted into the through hole 10 to provide a connection between the selector plate 4 and an after-mentioned actuator 2. To this end, one end of the connecting arm 11 in the pocket plate 3 is attached to the selector plate 4, while the other end of the connecting arm 11 situated outside of the pocket plate 3 is connected to the actuator 2. That is, the selector plate 4 is rotated between the engagement position and the overrunning position by the actuator 2. Turning to FIGS. 1*a* and 1*b*, there is shown one example of an actuating structure of the SOWC 1 in more detail. According to the preferred example, an electromagnetic actuator is used as the actuator 2, and as illustrated in FIG. 1*a*, the actuator 2 comprises a plunger 12 that is electromagnetically withdrawn toward the actuator 2, and a return spring 13 that is fitted onto the plunger 12 to push the plunger 12 away from the actuator 2.

A pair of collars 14 and 15 are formed on an intermediate portion of the plunger 12 while keeping a predetermined clearance therebetween. A head of the other end of the connecting arm 11 is held in the clearance between the collars 14 and 15 in a pivotal manner, and a leading end of the return spring 13 is brought into abutment to the collar 14. A leading end of the plunger 12 is inserted into a frame 16 as a stationary member while being allowed to reciprocate therein, and a ring 17 as a stopper member is fitted onto the leading end of the plunger 12 in the frame 16.

Specifically, the frame 16 is a part of a casing (not shown) holding the SOWC 1 or fixed to the casing, and a side wall 18 of the frame 16 has an insertion hole to which the leading end of the plunger 12 is inserted. A snap ring 19 is fitted onto an inner circumference of an opening of the frame 16 to retain the leading end of the plunger 12 within the frame 16.

The ring 17 is made of heat-shrinkable material, and an outer diameter of the ring 17 is larger than an opening size of the insertion hole of the side wall 18. In other words, the ring 17 is made of material whose linear expansion coefficient is greater than that of the plunger 12. Specifically, given that the temperature is extremely low (e.g., around minus 20 degrees C. or minus 4 degrees F.), the ring 17 is thermally shrunk to be engaged tightly with the plunger 20. In this situation, viscosity of the lubrication oil is increased and hence the selector plate 4 may be rotated unwillingly by a torque of the notch plate 5 through the lubrication oil. However, since the ring 17 is fitted tightly onto the plunger 12, withdrawal of the plunger 12 into the actuator 2 while compressing the return spring 13 can be prevented by the ring 17 coming into abutment to the side wall 18 of the frame 16 to prevent the selector plate 4 from being rotated undesirably to the engagement position. To this end, specifically, a shrinkage rate of the ring 17 is adjusted in such a manner as to establish friction between the ring 17 and the plunger 12 greater than the drag torque resulting from increase in viscosity of the oil to push the plunger 12 in the direction indicated by the arrow in FIG. 1*a* against the pushing force of the return spring 13, but weaker than the pulling force of the actuator 2 to withdraw the plunger 12 against the pushing force of the return spring 13.

Specifically, FIG. 1*a* shows the situation in which the selector plate 4 is rotated to the disengagement position so that the SOWC 1 is brought into the overrunning mode. In this situation, if the torque of the notch plate 5 is applied to the selector plate 4 through the oil, the plunger 12 is pushed by the connecting arm 11 toward the actuator 2. When the pushing force of the connecting arm 11 applied to the plunger 12 exceeds the pushing force of the return spring 13, the plunger 12 is moved toward the actuator 2, that is, moved in the direction to bring the SOWC 1 into the engagement mode. However, if the temperature is extremely low (e.g., around minus 20 degrees C. or minus 4 degrees F.), the ring 17 is thermally shrunk to be engaged tightly with the plunger 12 so that the plunger 12 can be prevented from being pushed into the actuator 2 by the ring 17 coming into abutment to the side wall 18 of the frame 16. Consequently, the SOWC 1 can be prevented from being brought into the engagement mode. Thus, according to the preferred embodiment, such undesirable engagement of the SOWC 1 can be prevented by simply arranging the frame 16 and the ring 17 without significant alteration.

FIG. 1*b* shows a contact portion between the frame 16 and the ring 17 enclosed by the dashed circle I in FIG. 1*a* in an enlarged scale. As illustrated in FIG. 1*b*, a corner of the side wall 18 of the frame 16 to be brought into contact to the ring 17 and a corner of the ring 17 to be brought into contact to the frame 16 are individually rounded to absorb a collision impact therebetween. According to the preferred embodiment, therefore, damage on the frame 16 and the ring 17 resulting from a collision of the ring 17 against the side wall 18 can be limited. In addition, a damage of the frame 16 resulting from stress concentration may also be limited.

Figure 3A:
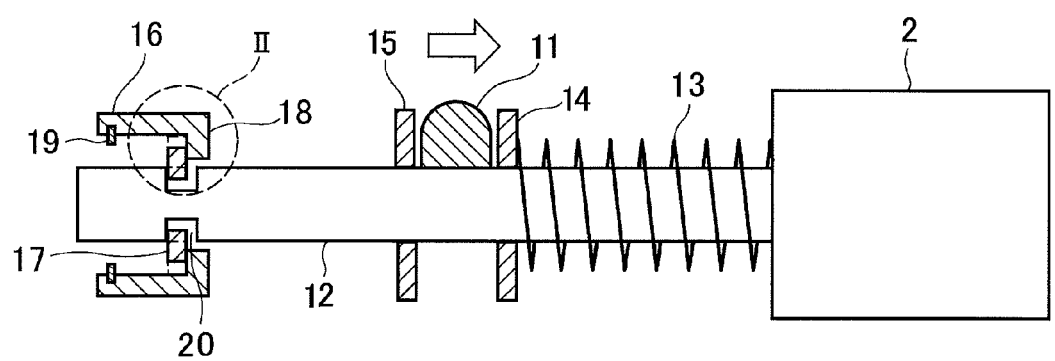
FIG. 3a is a cross-sectional view showing a cross-section of the stopper and the ring according to another example.
Figure 3B:
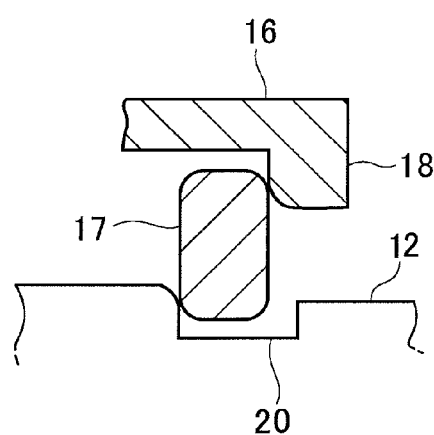

Turning to FIGS. 3*a* and 3*b*, there is shown another example of restricting the undesirable movement of the plunger 12 toward the actuator 2. In FIGS. 3*a* and 3*b*, same reference numerals are allotted to the elements in common with the example shown in FIGS. 1*a* and 1*b*, and a situation of the ring 17 at normal temperature is shown in the dashed circle II in FIG. 1*a*.

In the embodiment shown in FIG. 3*a*, a depression 20 as an annular groove is formed on a portion of the plunger 12 on which the ring 17 is fitted. An outer diameter of the depression 20 is smaller than an inner diameter of the ring 17 shrunk at the low temperature so that an inner circumferential portion of ring 17 shrunk at the low temperature is held in the depression 20. According to the embodiment shown in FIG. 3*a*, therefore, ring 17 can be engaged firmly with the plunger 12 so that the undesirable movement of the plunger 12 toward the actuator 2 can be stopped certainly by the side wall 18 of the frame 16.

Optionally, as illustrated in FIG. 3b, an inner circumferential corner of the ring 17 to be brought into contact to a side wall of the depression 20 may also be rounded to absorb a collision impact therebetween. According to the embodiment shown in FIG. 3a, therefore, damage on the depression 20 and the ring 17 resulting from a collision of the ring 17 against the depression may also be limited.

It will be apparent to those skilled in the art that various modifications and variations may be made to the disclosed selectable one-way clutch within the spirit of the present invention. For example, the ring 17 may also be made of thermally expansive material. In addition, structure or configuration of the frame 16 may be altered to an extent that the ring 17 is allowed to come into abutment at low temperature.

What is claimed is:

1. A selectable one-way clutch, in which a notch plate is selectively brought into engagement with a pocket plate by rotating a selector plate interposed therebetween by an actuator, comprising:
   a plunger that is connected to the selector plate and that is reciprocated by the actuator;
   a stopper member that is fitted onto the plunger; and
   a stationary member to which the stopper member is brought into abutment by a reciprocating motion of the plunger;
   wherein the stopper member is made of heat-shrinkable material such that the plunger is configured to perform the reciprocating motion when the stopper member is thermally expanded, and the stopper member is configured to restrict the reciprocating motion of the plunger when the stopper member is thermally shrunk, and
   wherein the stopper member is brought into abutment with the stationary member by the reciprocating motion of the plunger in a direction to bring the notch plate into engagement with the pocket plate.

2. The selectable one-way clutch as claimed in claim 1, wherein the stopper member includes a ring fitted onto the plunger, and
   wherein the ring is made of the heat-shrinkable material to be fitted tightly on the plunger when the ring is thermally shrunk.

3. The selectable one-way clutch as claimed in claim 1, wherein the stopper member includes a ring fitted onto the plunger,
   wherein an annular groove is formed on the plunger, and
   wherein the ring is made of the heat-shrinkable material in such a manner that an inner circumferential portion thereof enters into the annular groove when the ring is thermally shrunk.

* * * * *